United States Patent [19]
Kuhlmann et al.

[11] Patent Number: 4,550,500
[45] Date of Patent: Nov. 5, 1985

[54] COMPASS SAW WITH A CONNECTING DEVICE FOR A FLAT SAW BLADE

[75] Inventors: Gerhard Kuhlmann; Bernhard Remmele, both of Stuttgart, Fed. Rep. of Germany

[73] Assignee: Robert Bosch GmbH, Stuttgart, Fed. Rep. of Germany

[21] Appl. No.: 535,774

[22] Filed: Sep. 26, 1983

[30] Foreign Application Priority Data

Dec. 21, 1982 [DE] Fed. Rep. of Germany ....... 3247178

[51] Int. Cl.⁴ ............................................. B23D 49/16
[52] U.S. Cl. ........................................ 30/392; 83/697; 279/8; 403/342
[58] Field of Search .......................... 30/337, 392, 393; 403/261, 342, 354, 3 TD; 83/698, 697; 145/35 E; 279/8

[56] References Cited

U.S. PATENT DOCUMENTS

| | | | |
|---|---|---|---|
| 287,809 | 11/1883 | Devereux | 403/342 X |
| 4,020,555 | 5/1977 | Hendrick | 145/35 E |
| 4,277,197 | 7/1981 | Bingham | 403/342 X |

Primary Examiner—Douglas D. Watts
Attorney, Agent, or Firm—Michael J. Striker

[57] ABSTRACT

In a compass saw formed as a hand-held machine tool a flat saw blade is connected with a flat reciprocating rod by a connecting device which comprises a cup-shaped clamping sleeve screwed on a rotary member formed with a through hole extended in the direction of elongation of the reciprocating rod the end of which is inserted into that hole. The shaft of the saw blade passes through a bore formed in the clamping sleeve and partially extends into the hole in the rotary member. Two opposing pins formed on the shaft of the saw blade limit the extension of the saw blade shaft into the hole of the rotary member. The end of the shaft is pressed against a recess formed in the reciprocating member, on the one hand, and the pins of the shaft are engaged in depressions formed in the rotary member, on the other hand, whereby clamping of the shaft of the saw blade with the end of the reciprocating rod in the clamping sleeve is ensured.

7 Claims, 8 Drawing Figures

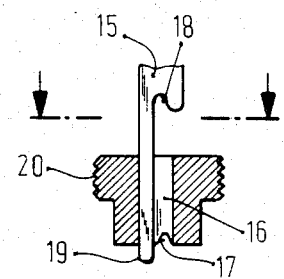
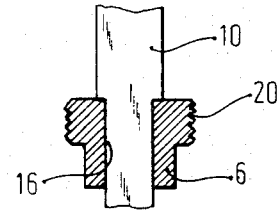
Fig. 2   Fig. 3
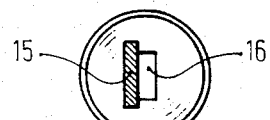
Fig. 4
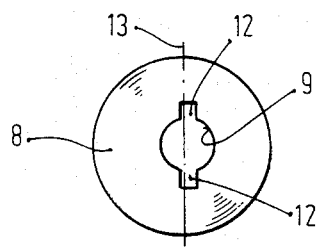
Fig. 5
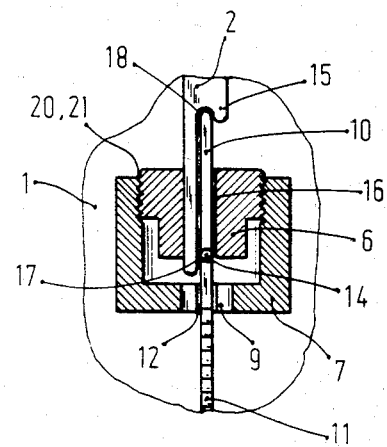
Fig. 7
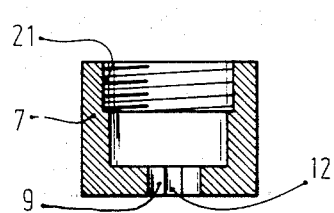
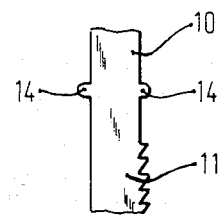
Fig. 6   Fig. 8

COMPASS SAW WITH A CONNECTING DEVICE FOR A FLAT SAW BLADE

BACKGROUND OF THE INVENTION

The present invention relates to compass saws in which flat saw blades are utilized. More particularly, the invention relates to a device for connecting a saw blade to the end of a reciprocating rod of a hand held motor-driven saw.

A connecting mechanism for a saw blade of the foregoing type is disclosed, for example in the U.S. Pat. No. 4,020,555. The connecting mechanism disclosed in the above patent includes a reciprocating shaft having a round cross-section. The saw blade can be easily disengaged from the reciprocating shaft or engaged with it again and thus can be easily replaced by a new one. The problem with this otherwise satisfactory connecting mechanism is that it can not be used for rigidly clamping the saw blade with a very advantageous flat reciprocating rod. The saw blade locked in the connecting device is not mounted there sufficiently rigidly. Therefore an unavoidable clearance or play in a holder for holding the shaft of the saw blade provided for manufacturing reasons causes significant noise during operation of the saw and also increases wear of the shaft of the saw and of the shaft holder provided at the end of the reciprocating shaft. Thus a cut resulting from the use of the known compass saw is not as neat as desired. Furthermore, due to the circular cross-section of the reciprocating rod there are required a coulisse for driving of the reciprocating rod and a precise guide for guiding the saw blade in the feeding direction, which are unnecessary in the case of use of the flat reciprocating rod. The reciprocating shaft or rod and the coulisse are comparatively heavy and their manufacturing is expensive.

SUMMARY OF THE INVENTION

It is an object of the invention to provide a connecting device for a compass saw which can be utilized with a flat reciprocating rod and which is light and stable in operation.

It is a further object of the invention to provide improved connecting means for clamping the saw blade with the end of the reciprocating rod in a simple manner.

These and other objects of the invention are attained by a compass saw which comprises an elongated reciprocating rod; a flat saw blade with a flat shaft and having a longitudinal axis; and means for connecting said saw blade to said reciprocating rod, said connecting means comprising a clamping sleeve rotatable about the longitudinal axis of the saw blade and provided with a bore through which the shaft of the saw blade passes to be connected to the reciprocating rod, said shaft being formed with two opposing pins extended outwardly from its edges, said clamping sleeve being formed with two additional bores extended radially outwardly from said bore and opposing each other, said reciprocating rod having an end portion adapted to support an end of said shaft, said reciprocating rod being substantially flat; and a rotary member connected to the end of the reciprocating rod and aligned thereto in the direction of elongation thereof, said rotary member being connectable to said clamping sleeve and having a flat perforation extended in the direction of elongation of the reciprocating rod and the direction of elongation of said saw blade, said perforation being formed so that it receives said shaft after the latter has passed said bore but prevents said pins from entering said perforation, said rotary member being formed with a supporting surface for clamping said pins of said shaft with said rotary member and thus with said clamping sleeve when the latter is connected to the rotary member.

The rotary member is threaded into the clamping sleeve. Due to the provision of the outer thread on the rotary member and the inner thread on the clamping sleeve and due to the provision of the rotary member with a perforation the end of the reciprocating member and shaft of the saw blade are received in that perforation and clamped in the clamping sleeve when the latter is tightly screwed on the rotary member.

The saw according to the invention is easy to manufacture and is precise in practice.

The connecting device according to the invention ensures a precise alignment of the reciprocating rod and the saw blade in the longitudinal direction thereof.

The rotary member may be formed with two prismatic depressions extended outwardly from said perforation, said pins being adapted to be engaged within said prismatic depressions.

Furthermore, the end portion of said reciprocating rod may be formed with a recess having a supporting surface extended transversally to the elongation of said reciprocating rod, for supporting said end of the shaft of the saw blade. Said supporting surface of the recess may be prismatic, said recess being aligned with the prismatic depressions of the rotary member along the longitudinal axis of the saw blade.

The end of the reciprocating rod can be riveted or glued or otherwise rigidly connected to the rotary member.

It is particularly advantageous that for a precise clamping of the saw blades of different thickness, prismatic depressions in the rotary member and the end of the reciprocating rod are formed, which depressions are aligned in the direction of elongation of the saw blade and provided for centering the pins on the blade and the end of the shaft of the saw blade.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 2 is a sectional view of a rotary member with the end of the reciprocating rod of the compass saw;

FIG. 3 is a sectional view of the rotary member with the end of the reciprocating rod passing therethrough as seen from arrow A of FIG. 2;

FIG. 4 is a sectional view along line IV—IV of FIG. 2;

FIG. 5 is a plan view from below of a clamping sleeve of the connecting device according to the invention;

FIG. 6 is a sectional view through the clamping sleeve of FIG. 5;

FIG. 7 is a sectional view of the connecting device in assembly; and

FIG. 8 is a side view of the saw blade, in portion, with the saw blade shaft.

DETAILED DESCRIPTION OF THE PREFERRED EMBODIMENTS

Figure 1:
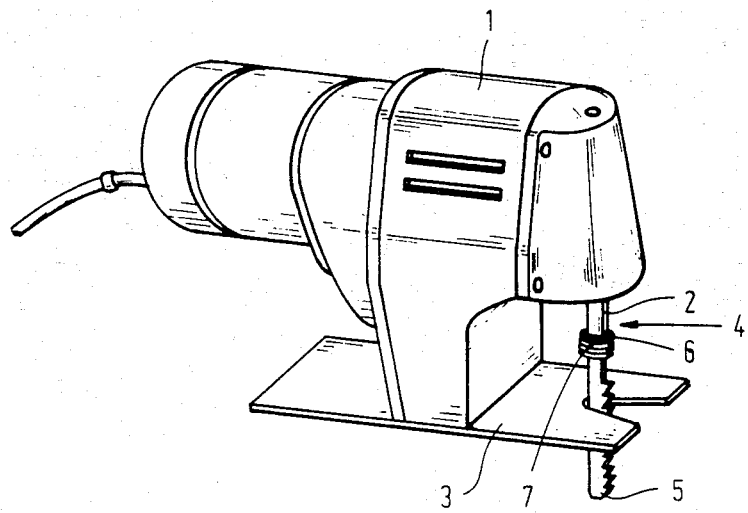
FIG. 1 is a perspective view of a hand-held compass saw with a connecting device for a flat saw blade, according to the invention.

FIG. 1 illustrates a compass saw 1 which is formed as a hand-held tool. Compass saw 1 includes a substantially flat reciprocating rod 2 mounted to a drive (not shown) arranged in the casing of the compass saw and a guide shoe 3. A connecting device for connecting a saw blade 5 to the end of the reciprocating rod 2 is generally designated by reference numeral 4. With reference to FIGS. 1 and 7 it is seen than the connecting device includes a rotary member 6 and a clamping sleeve 7 screwed thereon. The clamping sleeve 7 is cup-shaped and formed with a gripping knurling on the outer surface thereof. As shown in FIG. 5 the bottom 8 of the clamping sleeve 7 has a substantially round through opening, through which a shaft 10 of the saw blade 11 can pass. Two opposing through openings 12 extended outwardly radially from opening 9 are also formed in the bottom 8 of clamping sleeve 7. Openings 12 are laterally offset from a central plane 13 of the clamping sleeve 7. Through openings 12 serve for receiving and passing therethrough of pins or projections 14 made at the edges of the flat shaft 10 of the saw blade 11. Pins 14 extend outwardly from the edges of shaft 10. Reciprocating rod 2 has an end portion 15 to which the rotary member 6 is connected. This connection is obtained by means of a through hole or perforation 16 formed in the rotary member 6, which perforation is substantially rectangular and flat. The end portion 15 of rod 2 extends into perforation 16 and beyond the latter and is riveted or glued, at its overlapped end 19, to the rotary member 6. The perforation 16 has a somewhat wider area or portion shown in FIG. 4, which receives shaft 10 of the saw blade 11. This widened portion is so dimensioned that pins 14 provided at the edges of shaft 10 are not able to enter perforation 16 from below when shaft 10 of the saw blade is inserted into this perforation.

Two prismatic depressions or grooves 17 are formed in the end face of the rotary member 6, these depressions receiving pins 14 at the end of the end portion 15 of the reciprocating rod 2 and serve as supporting surfaces for those pins as shaft 10 is inserted into perforation 16. Another primatic depression or groove 18 is formed in a step of the end portion 15 of the reciprocating rod 2; the peripheral surface of depression 18 serves to accommodate and support the upper end of shaft 10 as shown in FIG. 7. The distance between the prismatic depressions 17 and 18 is adjusted according to the distance between the end of shaft 10 and pins 14. The rotary member 6 has an outer thread 20 which is screwed into an inner thread 21 of the clamping sleeve 7.

If the compass saw 1 is to be used the clamping sleeve 7 is loosened from member 6 so far that shaft 10 of the saw blade 11 can be inserted into opening 9 and additional openings 12, unless pins 14 of shaft 10 reach the position between the rotary member 6 and bottom 8 of the clamping sleeve. The saw blade 11 is now aligned in the direction of elongation of reciprocating rod 2 and the upper end of shaft 10 is inserted into the prismatic depression 18 and the pins 14 become housed in the prismatic depressions 17 so that the pins 14 do not lie opposite to the through holes 12. The clamping sleeve 7 can be now rigidly screwed on the outer thread of rotary member 6, whereby pins 14, upon this connection, will press against the supporting surfaces of prismatic depressions 17 while the end of shaft 10 will press against prismatic depression 18. In the assembled connecting device, in only one possible rotation position, can both pins 14 lie opposite to the through openings 12.

Thread 20, 21 is preferably so selected that bottom 8, during the clamping, presses against both pins 14 of shaft 10. Saw blade 11 is thus rigidly clamped. The operating movement of the saw blade takes place after an ensured alignment of the blade with the longitudinal axis of the reciprocating rod 2 and strictly in the longitudinal direction has been reached. Thus a precise cut made by the saw blade is warranted.

In order to exchange the saw blade for a new one, the clamping sleeve is loosened from rotary member 6 unless the saw blade 11 can be freed from the prismatic depressions 17 and 18. Then additional openings 12 permit pulling out of shaft 10 with pins 14 from rod 2. A new saw blade can be inserted into opening 9 to be connected to the end portion of the reciprocating rod 2 in the same manner as described above.

It is understood that the reciprocation of rod 2 is caused by a motor (not shown) mounted in the casing of the hand-held saw in the conventional manner.

It will be understood that each of the elements described above, or two or more together, may also find a useful application in other types of compass saws with a connecting device for a flat saw blade differing from the types described above.

While the invention has been illustrated and described as embodied in a compass saw with a connecting device for a flat saw blade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motor-driven compass saw, a combination comprising an elongated reciprocating rod; a flat saw blade with a flat shaft and having a longitudinal axis; and means for connecting said saw blade to said reciprocating rod, said connecting means comprising a clamping sleeve rotatable about the longitudinal axis of the saw blade and provided with a bore through which the shaft of the saw blade passes to be connected to the reciprocating rod, said shaft being formed with two opposing pins extended outwardly from its edges, said clamping sleeve being formed with two additional bores extended radially outwardly from said bore and opposing each other, said reciprocating rod having an end portion adapted to support an end of said shaft, said reciprocating rod being substantially flat; and a rotary member connected to the end of the reciprocating rod and aligned therewith in the direction of elongation thereof, said rotary member being inserted into said clamping sleeve and connected thereto by internal and external threads respectfully formed on the rotary member and the clamping sleeve, said rotary member having a substantially flat perforation extended in the direction of elongation of the reciprocating rod and the direction of elongation of said saw blade, said perforation being formed so that it receives said shaft after the latter has passed said bore but prevents said pins from entering said perforation, and also receives the end of the flat reciprocating rod to tightly connect said rotary member to said reciprocating rod, said rotary member being formed with surface means in which said pins of said shaft are clamped whereby said clamping sleeve is clamped with said shaft when the said sleeve is connected to the rotary member.

2. The saw as defined in claim 1, wherein said rotary member has an end face facing towards said pins of said shaft, said end face being formed with two prismatic depressions extended outwardly from said perforation and forming on said end face said surface means; said pins being adapted to be engaged within said prismatic depressions.

3. The saw as defined in claim 2, wherein said end portion of said reciprocating rod is formed with a recess having a supporting surface extended transversally to the elongation of said reciprocating rod, for supporting said end of the shaft of the saw blade.

4. The saw as defined in claim 3, wherein said supporting surface of said recess is prismatic, said recess being aligned with said prismatic depressions of said rotary member along the longitudinal axis of the saw blade.

5. The saw as defined in claim 4, wherein said end of the reciprocating rod received in said perforation is riveted to the rotary member.

6. The saw as defined in claim 4, wherein said end of the reciprocating rod received in said performation is glued to the rotary member.

7. The saw as defined in claim 1, wherein said clamping sleeve has a central plane, said additional bores being offset from said central plane, said pins passing said additional bores before said pins are clamped in said surface means.

* * * * *